United States Patent [19]
Hustad

[11] Patent Number: 5,103,979
[45] Date of Patent: Apr. 14, 1992

[54] PACKAGE HAVING PEEL SEAL TAMPER-EVIDENCE MESSAGE

[75] Inventor: Gerald O. Hustad, McFarland, Wis.

[73] Assignee: Oscar Mayer Foods Corp., Madison, Wis.

[21] Appl. No.: 419,695

[22] Filed: Oct. 11, 1989

[51] Int. Cl.⁵ ............................................. B65D 65/40
[52] U.S. Cl. .................................... 206/459; 206/807; 383/5
[58] Field of Search .................... 206/459, 807; 383/5, 383/63, 65; 215/203

[56] References Cited

U.S. PATENT DOCUMENTS

| | | | |
|---|---|---|---|
| 3,625,270 | 12/1971 | Skendzic | 383/63 |
| 3,647,485 | 3/1972 | Seiferth et al. | 99/174 |
| 3,740,237 | 6/1973 | Grindrod et al. | 99/171 S |
| 3,780,781 | 12/1973 | Uramoto | 150/3 |
| 3,827,472 | 8/1974 | Uramoto | 383/63 |
| 3,923,198 | 12/1975 | Brochman | 215/203 |
| 4,015,771 | 4/1977 | Sengewald | 229/62 |
| 4,098,577 | 7/1978 | Halpern | 206/807 |
| 4,273,815 | 6/1981 | Gifford | 428/35 |
| 4,448,317 | 5/1984 | Thompson | 215/203 |
| 4,489,841 | 12/1984 | Thompson | 215/203 |
| 4,505,399 | 3/1985 | Weiner | 215/203 |
| 4,526,752 | 7/1985 | Perlman et al. | 206/459 |
| 4,557,505 | 12/1985 | Schaefer et al. | 383/5 |
| 4,589,145 | 5/1986 | Van Erden et al. | 206/459 |
| 4,655,862 | 4/1987 | Christoff et al. | 383/63 |
| 4,709,396 | 11/1987 | Voshall et al. | 383/5 |
| 4,709,397 | 11/1987 | Voshall et al. | 383/5 |
| 4,718,553 | 1/1988 | Adamoli et al. | 206/459 |
| 4,749,084 | 6/1988 | Pereyra | 206/459 |
| 4,782,951 | 11/1988 | Griesbach et al. | 206/484 |
| 4,786,190 | 11/1988 | Van Erden et al. | 383/61 |
| 4,792,053 | 12/1988 | Towns et al. | 215/250 |
| 4,823,961 | 4/1989 | Griesbach et al. | 206/632 |
| 4,834,552 | 5/1989 | Makowka | 383/5 |
| 4,876,123 | 10/1989 | Rivera et al. | 206/807 |
| 4,905,851 | 3/1990 | Thompson | 215/203 |
| 4,931,327 | 6/1990 | Liu et al. | 206/807 |
| 4,944,603 | 7/1990 | Cornish et al. | 383/61 |
| 4,966,470 | 10/1990 | Thompson et al. | 383/61 |
| 4,972,953 | 11/1990 | Friedman et al. | 206/459 |

*Primary Examiner*—David T. Fidel
*Attorney, Agent, or Firm*—Lockwood, Alex, Fitzgibbon & Cummings

[57] ABSTRACT

A package is provided which incorporates a peel seal area or areas that provide readily detectable evidence that the package has been opened or tampered with. Message indicia are provided at the peel seal, and the appearance of the message indicia changes when the peel seal area, which has a contact clarity condition when sealed, is broken resulting in the onset of an opacity condition which thereby obscures message indicia and/or makes message indicia visible in order to inform a consumer or potential purchaser that the peel seal has been broken.

9 Claims, 3 Drawing Sheets

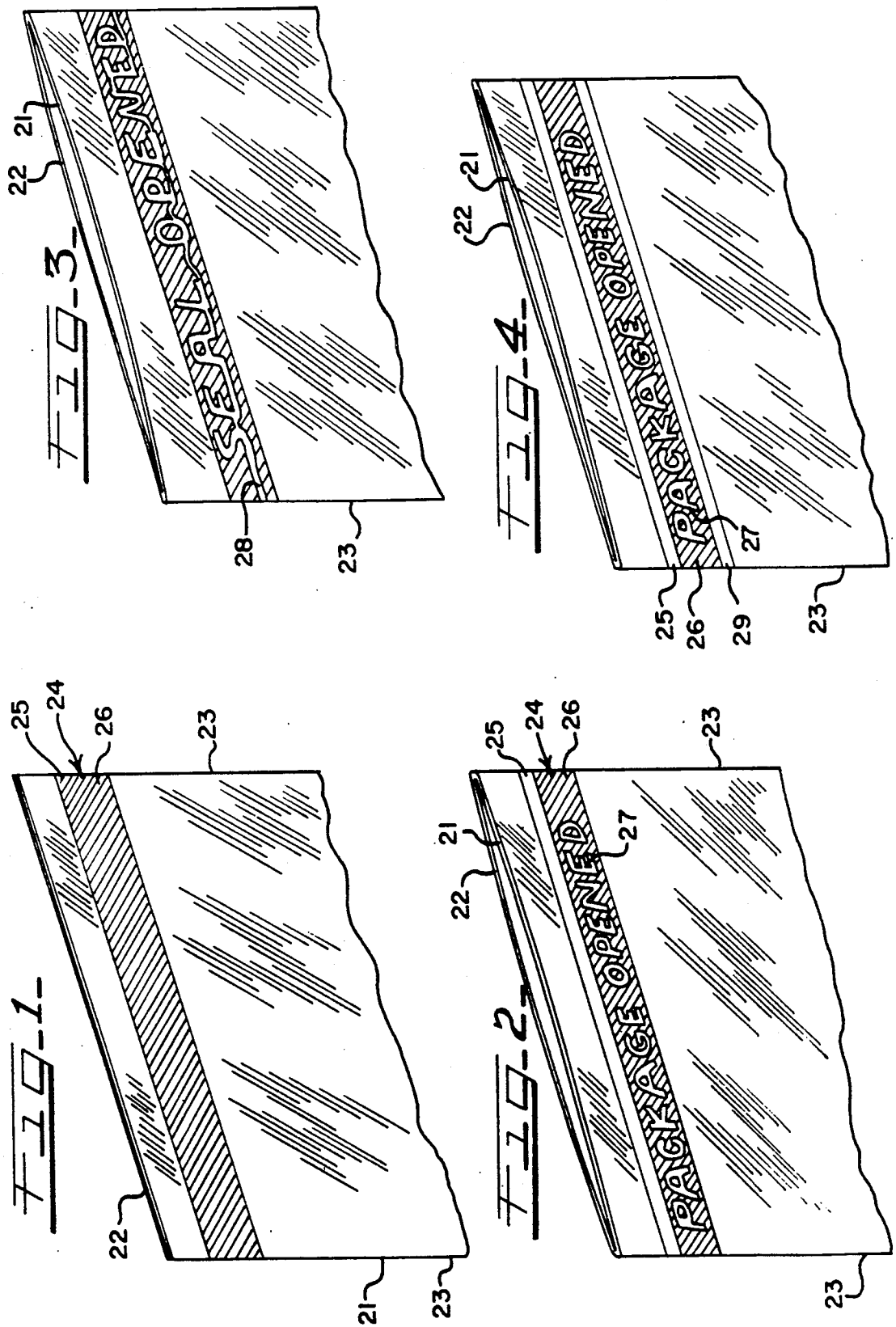

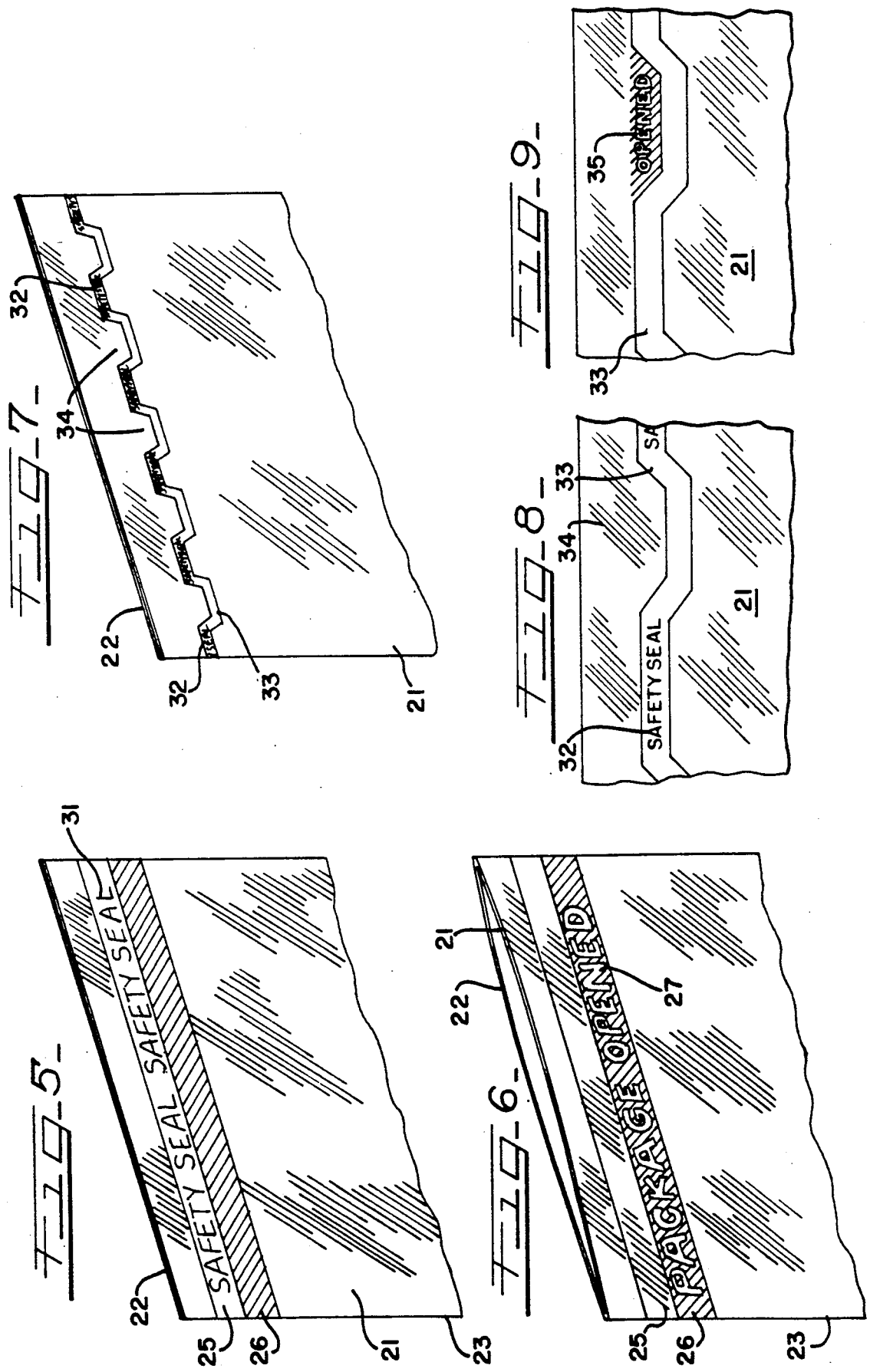

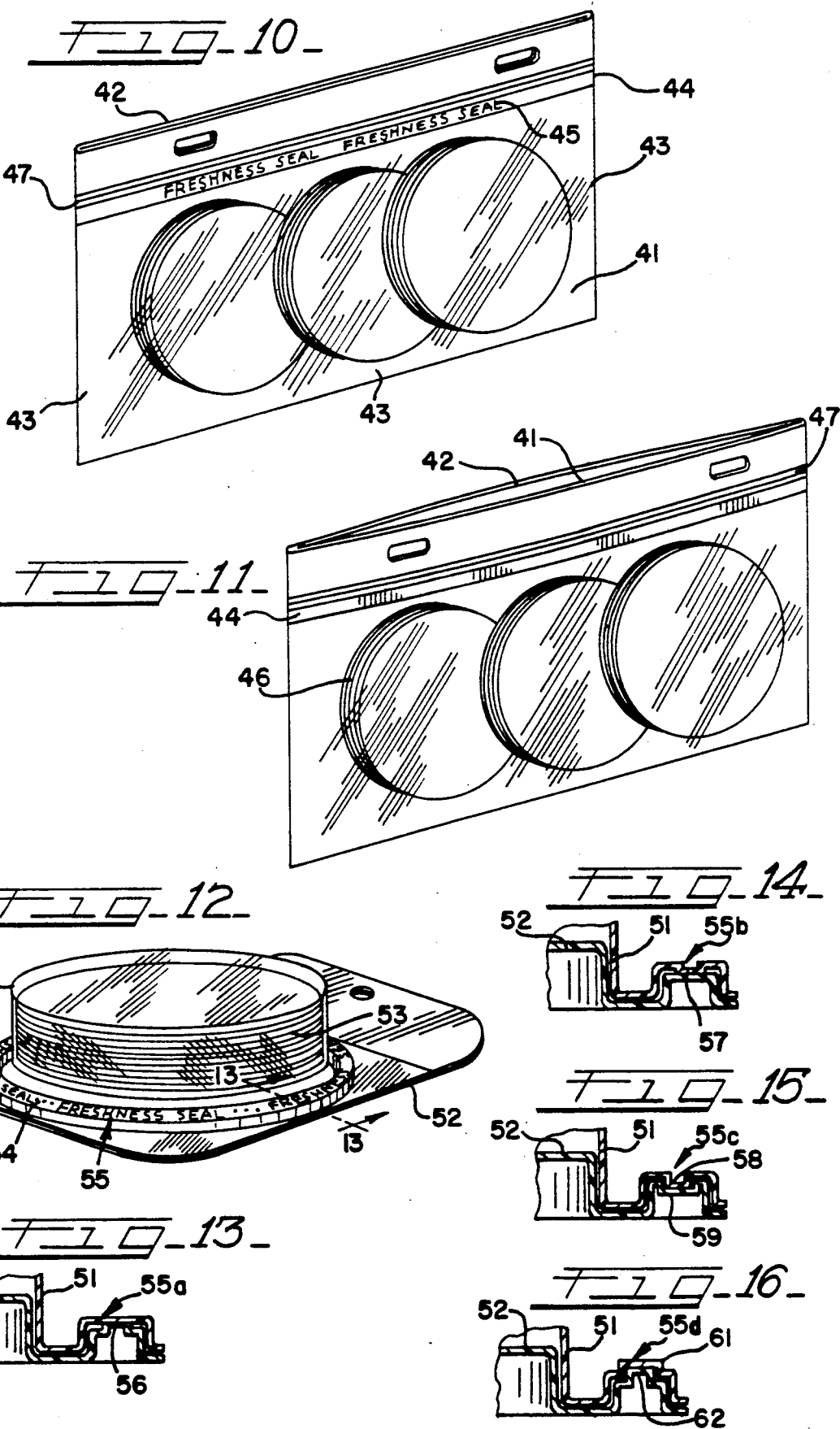

PACKAGE HAVING PEEL SEAL TAMPER-EVIDENCE MESSAGE

BACKGROUND AND DESCRIPTION OF THE INVENTION

The present invention generally relates to packages for hermetically sealing consumable products between generally opposing panels. More particularly, the invention relates to these types of packages which include a peelable seal that secures together at least a portion of the sealing interface between the generally opposing panels. The peel seal incorporates a tamper-evidence feature which conveys a message to the consumer when the peel seal is broken.

Packages having generally opposing panels for hermetically sealing any number of various products are well known. Also well known are packages of this type which incorporate a so-called peel seal. Peel seals can provide a hermetic seal that is suitable for vacuum packaging, for gas-flushed packaging, or other packaging wherein it is important to maintain a closure that will substantially prevent air or gas from entering or leaving the package through the seal, while at the same time provide a seal which can be conveniently opened by the application of digital forces.

Packages of this type provide a convenient and effective means for packaging, distributing and marketing a wide variety of products which would otherwise not exhibit the shelf life that is needed for these products, including those which are intended for human consumption. As exemplified by U.S. Pat. No. 3,647,485, a hermetic breakaway or peelable seal can be formed between an ethylene-polar monomer polymer film or coating and a thermoplastic film. U.S. Pat. No. 3,740,237 describes enclosing a product between a pair of films so as to provide a package having a product enclosing portion and a peripheral flange, and the pair of films are joined to form a hermetic dual seal by applying a continuous strip of peelable bond adhesive through a portion of the film in order to provide the peel seal of that patent. U.S. Pat. No. 4,273,815 describes a laminated film having at least one lamina of polyvinylidene chloride film adhered to at least one lamina of chlorinated polyethylene. Sometimes peel seals are combined with features for providing a reclosable package, such as by incorporating an interlocking strip assembly at a location generally proximate to the peel seal. Examples of patents in this regard include U.S. Pat. No. 4,782,951 and U.S. Pat. No. 4,823,961. The subject matter of all of these patents is incorporated by reference hereinto.

One of the sometimes perceived shortcomings of packages incorporating peel seals is that it is often not readily apparent to the casual observer that the peel seal has been opened. This situation can be further complicated when the package closure arrangement includes members that can be opened and reclosed without ready detection thereof, which is typically the case when reclosable interlocking strips are used. Various approaches have been taken or proposed in order to ensure detection of seal opening or tampering. Exemplary of the various techniques which have been known for providing visual, tamper-evident features on packaging include U.S. Pat. No. 3,780,781, U.S. Pat. No. 4,015,771 and U.S. Pat. No. 4,786,190. Copending applications directed to tamper-evident arrangements in flexible packages and the like include U.S. patent application Ser. No. 315,352 of Thompson, Hustad and Marnocha, filed Feb. 24, 1989; U.S. patent application Ser. No. 338,268 of Cornish, Mally, Thiemann and Thompson, filed Apr. 14, 1989; and U.S. patent application Ser. No. 373,399 of Hustad, Thiemann and Wells, filed June 30, 1989.

Developments of this type address the fact that, but for the tamper-evident members provided thereby, a package which has been opened and thereafter reclosed would have an outward appearance comparable to a package which retains its hermetic peel seal, and this opening and reclosing could not be readily detected unless all or a noticeable portion of the contents of the package have been removed. Of course, the likelihood of detection of a package that had been opened and reclosed would be greater for vacuum-packed products because the distinctive product-conforming shape of a vacuum package would be modified in a manner that should be discernible to most knowledgeable consumers. Determining that a package which is not vacuum sealed, such as a gas-flushed package, had been previously opened usually would be more difficult. Typically, the tamper-evident means that have been provided or proposed heretofore incorporate a supplementary component such as a tear strip, an extra tab, or the like. Generally, these complicate the package sealing procedure and/or increase the cost of the package.

Accordingly, there is a need for a package of this general type which possesses the convenience of incorporating a peelable seal that is readily opened by the application of digital forces and that provides readily discernible evidence that the peelable seal has been broken, but without the need for adding panels, tabs, tear strips, paper components, tapes and the like. It is important that this need be fulfilled by means which make it readily apparent to the consumer in the store (that is, before the package is purchased by the consumer) that the package had been previously opened or that its peel seal had been otherwise tampered with. This package must be suitable for products intended for human use or consumption, including various food products such as wieners, bacon, sliced luncheon meats, chops, cheese and the like.

In summary, the packages according to the present invention are for hermetically sealing products between generally opposing panels which provide a substantially airtight seal of the product within the package. At least a portion of the seal joining the panels together has peelable properties such that access to the products within the package can be gained by breaking the peelable seal. This peelable seal itself includes tamper evidence means such that breaking of the seal is signaled by a readily discernible modification in the appearance of a message component of the peelable seal area. The peelable seal area has a contact clarity condition that is disrupted to an opacity condition in order to obscure, create or both obscure and create message indicia at the peel seal area, which message indicia inform the purchaser that the peel seal is no longer fully intact.

It is accordingly a general object of the present invention to provide an improved tamper-evident package having a peel seal.

Another object of the present invention is to provide an improved tamper-evident package which incorporates message indicia within the peel seal area in order to directly inform the consumer or prospective purchaser that the peel seal has been opened.

Another object of this invention is to provide a tamper-evident package and method which achieves a tamper-evident objective without requiring added panels, tabs, tear strips and the like.

Another object of the present invention is to provide an improved product package and method that utilizes peel seal means which exhibit a contact clarity condition prior to opening and an out-of-contact opacity condition which creates and/or obscures message indicia that directly indicate the seal has been broken.

Another object of this invention is to provide an improved product package that incorporates a peel seal having tamper-evidence characteristics without incurring any, or only minimal, cost upcharge.

Another object of the present invention is to provide an improved peel seal tamper-evidence characteristic for packages incorporating films which are commercially printed and/or varnished or otherwise coated.

These and other objects, features and advantages of the present invention will be clearly understood through a consideration of the following detailed description.

BRIEF DESCRIPTION OF THE DRAWINGS

In the course of this description, reference will be made to the attached drawings, wherein:

FIG. 1 is a perspective view, partially broken away, of a package according to the present invention prior to opening thereof;

FIG. 2 is a perspective view, partially cut away, of the package shown in FIG. 1 after opening of the tamper-evident peel seal thereof;

FIG. 3 is a perspective view, partially cut away, showing the opened condition of another embodiment similar to that of FIG. 2;

FIG. 4 is a perspective view, partially cut away, showing the opened condition of another embodiment similar to that of FIG. 2;

FIG. 5 is a perspective view, partially cut away, of an embodiment that incorporates the features of FIG. 1 in conjunction with a peel seal component by which a printed message is obscured;

FIG. 6 is a perspective view, partially cut away, of the embodiment of FIG. 5 shown in its opened condition;

FIG. 7 is a perspective view, partially cut away, of an embodiment similar to that shown in FIG. 5, but incorporating a plurality of staggered, alternating message areas;

FIG. 8 is an enlarged elevation view of the package shown in FIG. 7 in its pre-opened condition;

FIG. 9 is an enlarged elevation view of the package shown in FIG. 7 in its opened condition;

FIG. 10 is a perspective view of a preferred embodiment according to the present invention, shown in its sealed or pre-opened condition;

FIG. 11 is a perspective view of the embodiment of FIG. 10, shown in its opened, message obscuring condition;

FIG. 12 is a perspective view of a further embodiment of the present invention wherein the generally opposing package panels take the form of generally rigid or semi-rigid thermoformed components;

FIG. 13 is a cross-section along the line 13—13 of FIG. 12;

FIG. 14 is a cross-sectional view similar to FIG. 13, but illustrating an alternative embodiment;

FIG. 15 is a cross-sectional view similar to FIG. 13, and illustrating an alternative embodiment; and FIG. 16 is a cross-sectional view similar to FIG. 13 and showing yet a further optional embodiment of the seal area.

DESCRIPTION OF THE PARTICULAR EMBODIMENTS

In each of the embodiments, the packages are in-store tamper-evident such that it is apparent to the consumer that the package has been opened or otherwise tampered with upon even a casual examination of the package because the peel seal area itself contains message indicia which undergo a substantial change in legibility or discernibility thereof when the peel seal is opened. This change in legibility or discernibility is caused by including peel seal means which exhibit a contact clarity condition when closed and an out-of-contact opacity condition when opened. This change in appearance will accomplish either an obscuring of a seal-indicating message or an appearance of a seal-broken message, or a combination of both functions. The embodiments shown in FIGS. 1 through 4 incorporate only a seal-broken message; the embodiments shown in FIGS. 10 through 16 incorporate means for obscuring a seal-indicating message; and the embodiments of FIGS. 5 through 9 incorporate both a seal-indicating message and a seal-broken message.

With more particular reference to the embodiment shown in FIGS. 1 and 2, this is an example of a package for sealing a product (not shown), for example consumable or comestible items including foods and the like, between two sheets of flexible film material. Included is a front panel 21 and a rear panel 22 which are secured together on three sides by non-peelable edge seals 23 and a peel seal area, generally designated as 24. Edge seals 23 may also be peelable. In this particular embodiment, the peel seal area 24 includes a full-length peel seal area 25 and a message peel seal area 26.

The peel seal area 24 is formed by impressing the panels with a heat seal bar (not shown) to thereby form a peelable seal which is openable by digital forces between the front panel 21 and the rear panel 22. The panels 21 and 22 exhibit the following general characteristics. The peel seal area 24 has a contact clarity condition to the extent that the peel seal area 24 is substantially transparent so long as the close contact provided by the seal bar is maintained; that is, so long as the peel seal is not opened. When the peel seal area 24 is opened, the areas of sealing will exhibit an opacity condition whereby the coloration thereof changes, typically by having a cloudy or colored or "whitened" condition imparted thereto. This opacity condition is experienced in those areas where the peel seal had been imparted to the panels. In the embodiment illustrated in FIGS. 1 and 2, this opacity condition is shown in the fully opened package of FIG. 2 in the full-length peel seal area 25 and in message indicia 27 at the message peel seal area 26.

If desired, the contrast provided by the opacity condition can be enhanced by having coloration present at the message peel seal area 26. For example, the hatching lines shown in FIGS. 1 and 2 illustrate a color area that may be printed or otherwise provided at the message peel seal area, typically on or within the rear panel 22 thereof. Then, when the opacity condition is developed, it would cover or at least partially obscure same, as is illustrated in FIG. 2. When desired, the contrast enhancement can be achieved by incorporating a rear panel 22 which is itself tinted or otherwise colored either throughout its entirety or at selected locations, such as at the message peel seal area. Additional coloration, for example only at the message peel seal area, could also be added to panels colored in this manner.

Both the peel seal area 25 and the peel seal message indicia 27 are typically formed with a heat seal bar (not shown) having raised, film contacting surfaces that correspond to the desired pattern or message. In the embodiment illustrated in FIG. 2, the desired pattern takes the form of the full length peel seal area 25 and the message indicia 27. According to procedures that are well known, the heat seal bar is made of a material that will transfer heat from the seal bar to the film. The seal bar raised portions, such as those corresponding to message indicia 27, must be sufficiently high and well defined in order to easily transmit heat so as to form the desired clearly readable opacity condition indicia once the package is opened.

In the embodiment illustrated in FIG. 3, a message indicia area 28 is provided which itself provides a continuous sealing area from letter to letter that provides the desired peel seal across the full extent of the package being sealed. No separate full length peel seal area is included in this embodiment. The FIG. 4 embodiment is substantially the same as that of FIGS. 1 and 2, except a supplemental full length peel seal area 29 is also included.

The message indicia should convey the fact that the seal has been broken. Exemplary wording of the message indicia can include phrases such as "package opened", "safety seal", "void", "disrupted seal", "seal opened" and the like. Preferably, the message thus provided will be informative of seal disruption even if only a portion of the seal has been broken. This can be accomplished, for example, by providing a series of repeating indicia across the access opening portion of the package.

FIGS. 5 and 6 illustrate an embodiment wherein a message is provided at the full length peel seal area. For example, FIG. 6 shows the wording "safety seal" printed or otherwise present on the rear panel 22. This message information 31 is readily visible in its entirety for so long as the heat seal at the full length peel seal area 25 remains secure. Such message information 31 can be provided much in the same manner as the contrast area is provided at the cross hatching areas shown in FIGS. 1 through 6. The message information 31 could incorporate wording such as "safety seal", "safety sealed", "freshness seal" or the like. As can be seen in FIG. 6, this message information 31 is substantially obscured when the package is fully opened, and any portion thereof will likewise be obscured to the extent that the package has been opened.

The packaging shown in FIGS. 7, 8 and 9 extend the concept shown in FIGS. 5 and 6 to provide a plurality of message information locations 32 beneath a full length peel seal area 33 which has an undulating shape. When this seal area 33 is fully sealed as illustrated in FIG. 8, the indicia at the message information locations 32 (such as the printed wording "safety seal" in FIGS. 7 and 8) are fully visible, which indicia become obscured and substantially unreadable when the seal is opened as illustrated in FIG. 9. In the illustration of this embodiment shown in the drawings, a plurality of message peel seal areas 34 are provided in generally alternating fashion with the message information locations 32. Suitable message indicia 35, such as the wording "opened" appear by virtue of the heretofore described onset of the opacity condition when the panels are separated.

A preferred embodiment of the invention is illustrated in FIGS. 10 and 11. A front panel 41 and a rear panel 42 form a hermetically sealed package which typically includes edge seals 43. A peel seal area 44 is also included. This peel seal area 44 is a full length peel seal area, and it includes message information 45 in much the same manner as the message information 31 is provided in the embodiment shown in FIGS. 5 and 6. When the package is fully sealed, as shown in FIG. 10, the message information 45 is fully visible due to the contact clarity condition which exists when the heat seal is formed, as described herein. Message information 45 can take the form of wording such as "freshness seal", "vacuum seal", "safety seal" and the like. This message information 45 is directly within the width of the peel seal area 44, and it preferably extends across the entire mouth opening of the package in order to thereby substantially eliminate any chance that even a minor opening of the peel seal will go undetected.

In an especially preferred embodiment, the front panel 41 is substantially transparent, while the rear panel 42 is opaque and typically of a decorative color, while the message information 45 is of a strongly contrasting color. For example, the rear panel 42 can be a metalized film which has reflective characteristics that are significantly reduced upon the onset of the opacity condition at the peel seal area 44, as illustrated in FIG. 11. The package illustrated in FIGS. 10 and 11 is of the vacuum sealed variety, and a plurality of stacks 46 of sliced luncheon meat or the like are thus packaged therewithin. Other products, including bacon, sausages, cheese and the like are especially suitable for packaging by this arrangement.

Also illustrated is a reclosable sealing means 47 of the type that is known in the art, including U.S. Pat. Nos. 4,782,951 and 4,823,961. This reclosable sealing means permits the user to easily open and reclose the package after the seal at the peel seal area 44 has been broken.

A generally rigid, thermoformed food package, such as the type which is suitable for sliced luncheon meat, cheese and the like, is illustrated in FIG. 12. The package includes a cover panel 51 forming the front or top of the package. A base panel 52 forms the bottom or rear of a package The cover panel 51 and the base panel 52 enclose a food product 53 therebetween. Typically, the cover panel 51 is substantially transparent, and the base panel 52 is opaque and of an attractive color. The package itself may be vacuum closed or sealed, or it may be gas flushed and sealed with heat and/or pressure. A suitable pressure sensitive or heat sensitive adhesive may be included at peel seal area 54. Message information 55 such as "freshness seal", "vacuum seal+ or suitable tamper-evident message information 55 is at the peel seal area 54. When a contact clarity condition is imparted to the peel seal area 54 by heat and/or pressure induced contact between the cover panel and the base panel 52, the tamper-evident message information 55 is readily visible and discernible. When that contact clarity condition is disrupted by movement of the cover panel 51 and the base panel 52 out of engagement with each other, particularly at the peel seal area 54, an opacity condition develops which obscures the message information 55.

With more particular reference to the preferred means for providing the message information 55 in this embodiment, reference is made to FIGS. 13, 14, 15 and 16. The message information 55 consists of embossed or elevated indicia on either one or both of the cover panel 51 and base panel 52 at the peel seal area of this package. The embossed or elevated indicia can be impresssed at the time the panels are thermoformed, or at any other convenient time.

Message information 55a has embossed indicia 56 in the base panel 52, and adjacent portions of the cover panel 51 are in contact clarity engagement with the raised surface of the embossed indicia 56. In FIG. 14, the cover panel 51 includes embossed indicia 57 which engages the base panel 52 with a contact clarity condition in order to provide the message information 55b which becomes obscured when close engagement between the embossed indicia 57 and the base panel 52 is broken. The message information 55c of FIG. 15 is provided by complementary inwardly facing embossed indicia 58 and 59 in the cover panel 51 and base panel 52, respectively. The message information 55d of FIG. 16 is provided by complementary outwardly facing embossed indicia 61 and 62 in the cover panel 51 and base panel 52, respectively. When a glue or adhesive is incorporated, it is applied over one of these embossed areas and between the cover panel 51 and the base panel 52.

The panels forming the packages according to the present invention can be made from a variety of materials including films, multi-layered laminates or co-extrusions, thermoformable materials and the like. The panels are formulated and/or modified with coatings in order to provide the needed contact clarity condition combined with the onset of an opacity condition when panel contact is broken. When multi-layered films are used, it is typically desirable that the printing or other means for providing the needed tamper-indicating indicia in some of the embodiments is imparted to an innermost portion of the multi-layered panel. For example, for a two-layered panel, the printing or the like could be present at the interface between the layers of the panel. By this arrangement, the ink or the like forming the indicia will not interfere with the properties of the peel seal and will not cause any concerns for contacting same with a product such as food within the package. It is also possible to utilize coatings such as so-called varnished films in order to provide this type of protection for and/or from the ink or the like. A varnish-like overcoat can also be desirable when the film is of the metalized variety.

Peelable films of the type described herein can be characterized as falling within one of two categories. In one general category, called cohesive seal failure, sealant is contaminated with another material which "weakens" the bond between the panels, and the seal area whitens when opened. The other category is of a delamination or breakaway type wherein the seal bond strength is greater than the laminate strength. The seal bond itself does not whiten, but a thin membrane of film is left behind in the seal area which gives a white opacity appearance when the package is opened. The width of this membrane typically will vary slightly throughout the length of the seal.

Examples of cohesive seal failure types of peelable films include the following combinations. One of the panels is a Surlyn (DuPont trademark) blend with polypropylene and an antiblock agent, which provides a peel seal to a Surlyn 1652 panel to provide a relatively strong peel seal of about 3.5 to about 7.5 pounds/inch. Another combination, which provides a weaker peel seal (between about 1.5 and about 2.5 pounds/inch), seals a Surlyn 1601 panel to a panel of a Surlyn blend with polybutylene. Another panel combination of the cohesive seal failure type which provides good peelability is a polyethylene blend with ethylene vinyl acetate and polybutylene. A Surlyn blend with ethylene vinyl acetate provides peelability between about 1 and about 2.5 pounds/inch. A linear low density polyethylene film system provides microwave approved packaging having seal strengths on the order of about 3 to about 6 pounds/inch. A film of Surlyn 1601 blended with polybutylene seals to straight Surlyn 1601 and also provides microwave approved packaging. Polyethylene film having the desired properties are also available. Another film combination that is of the cohesive seal failure type uses a low density polyethylene film with a film of Surlyn 1601 or 1652 blended with polybutylene or ethylene vinyl acetate.

Exemplary delamination or breakaway systems include Surlyn or polyethylene films (available from Curwood). Cryovac offers a Surlyn three-ply structure blended with ethylene vinyl acetate. Printpack provides a Surlyn or polyethylene system of this type, and Plicon provides a low density polyethylene system of the delamination or breakaway type. An exemplary delamination style of peelable surface is a polyester having a metalized surface on the inside of the panel and a coating of polyvinylidene chloride ("Saran"). A composite structure of polyethylene/ionomer may be used, with the ionomer layer being inside of the web. In this instance, the ionomer is a sealant compatible to the forming web, and the sealant incorporates a delamination style peelable structure. The panel thus formed provides the desired peel seal properties for a package of the type illustrated in FIGS. 10 and 11, with the companion film being a copolyester having a Saran coating and an ionomer that is a composite structure of polyethylene/ionomer, with the ionomer layer being inside of the web.

It will thus be seen that the present invention provides new and useful packaging having tamper-indication means, which packaging has a number of advantages and characteristics, including those pointed out herein and others which are inherent in the invention. Preferred embodiments of the invention have been described by way of example, and it is anticipated that modifications may be made to the described form without departing from the spirit of the invention or the scope of the appended claims.

I claim:

1. In a tamper-evident package for hermetically sealing products between generally opposing package film panels having a peelable seal securing the generally opposing package film panels together at a peelable seal area, the peelable seal being openable with digital forces and not reclosable, the improvement comprising:

tamper-evidence means disposed within said peelable seal area and formed within at least one of the generally opposing package film panels within said peelable seal area by heat sealing said generally opposing package film panels together, the tamper-evidence means indicating that said generally opposing package film panels have been separated at said peelable seal;

a message component formed within the at least one of said generally opposing package film panels within said peelable seal area, said message component having visual indicia means for informing of seal disruption, the visual indica means being formed within said peelable seal area by the heat seal adhering said two generally opposing film panels together without the necessity of adding a separate component layer to said peelable seal area;

said tamper-evidence means having a contact clarity condition when said package generally opposing panels are in a sealed state at said peelable seal area; and said tamper-evidence means having an opacity condition which develops within said peelable seal area upon and persists after disruption of the sealed state of said generally opposing package film panels at said peelable seal area, whereby the onset of said opacity condition causes a change in said peelable seal area of said generally opposing package film panels which changes the appearance of said generally opposing package film panels at said peel seal and allows detectability of a message component of said tamper-evidence means, said opacity condition being caused by a cohesive failure of said peelable seal in said at least one of said generally opposing package film panels without the delamination of said generally opposing package film panels within said peelable seal area.

2. The tamper-evident package according to claim 1, wherein said generally opposing panels are flexible films that are sealed together by said peelable seal and by edge seals to form a pouch for hermetically sealing product within the pouch.

3. The tamper-evident package according to claim 1, further including reclosable sealing means for joining said opposing panels at a location generally parallel to said peelable seal.

4. The tamper-evident package according to claim 1, further including adhesive means over said indicia means.

5. The tamper-evident package according to claim 1, wherein at least one of said panels is multi-layered and wherein said indicia means are between layers of said multi-layered panel.

6. The tamper-evident package according to claim 1, wherein said indicia means are between one of said panels and a coating thereover.

7. The tamper-evident package according to claim 1, wherein said peelable seal has a peel strength of between about 0.5 and about 7.5 pounds/inch.

8. The temper-evident package of claim 1, wherein said package includes a recloseable seal.

9. The tamper-evident package according to claim 1, wherein said message component is readily discernible for so long as said contact clarity persists and is obscured by the onset of said opacity condition.

* * * * *